No. 647,331. Patented Apr. 10, 1900.
F. L. SEELY.
MACHINE FOR MAKING AND BOXING TABLETS.
(Application filed July 27, 1899.)

(No Model.) 5 Sheets—Sheet 2.

Witnesses
Robert Everett
H. W. Parker

Inventor
Fred L. Seely
By James L. Norris
Atty.

No. 647,331. Patented Apr. 10, 1900.
F. L. SEELY.
MACHINE FOR MAKING AND BOXING TABLETS.
(Application filed July 27, 1899.)
(No Model.) 5 Sheets—Sheet 3.
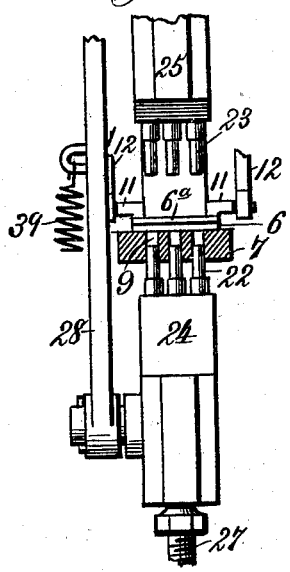
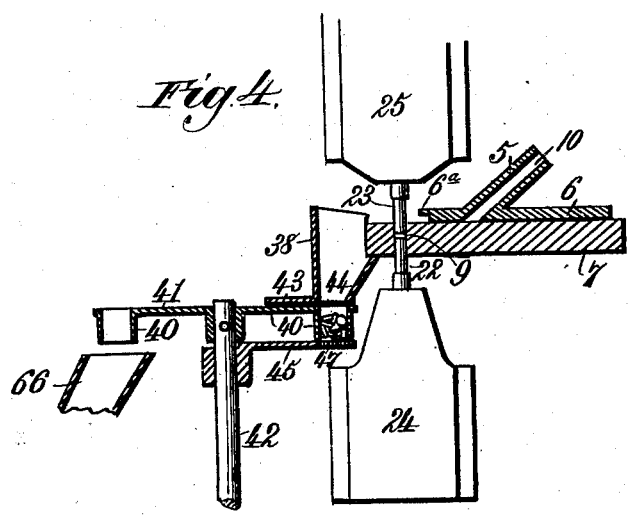
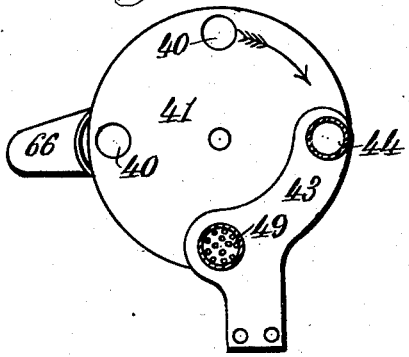
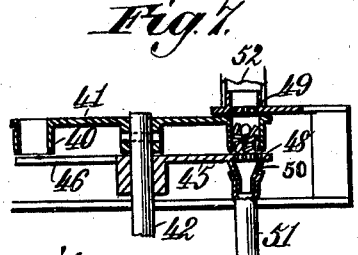
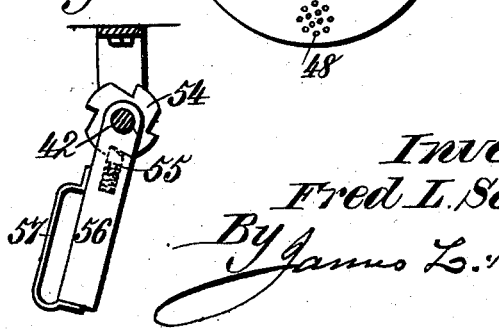
Inventor:
Fred L. Seely,
By James L. Norris,
Atty.
Witnesses.
Robert Everitt.

No. 647,331. Patented Apr. 10, 1900.
F. L. SEELY.
MACHINE FOR MAKING AND BOXING TABLETS.
(Application filed July 27, 1899.)

(No Model.) 5 Sheets—Sheet 4.

Witnesses.
Robert Everett.
A. E. Parker.

Inventor:
Fred L. Seely.
By James L. Norris.
Atty.

No. 647,331. Patented Apr. 10, 1900.
F. L. SEELY.
MACHINE FOR MAKING AND BOXING TABLETS.
(Application filed July 27, 1899.)
(No Model.) 5 Sheets—Sheet 5.
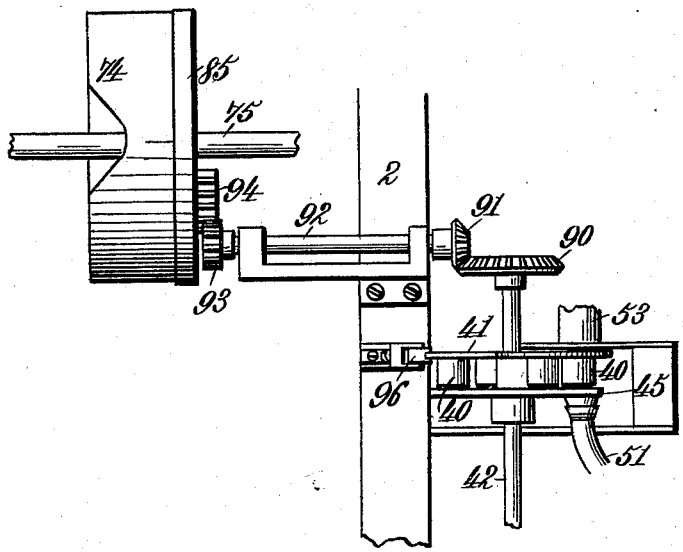
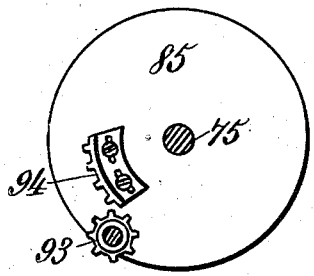
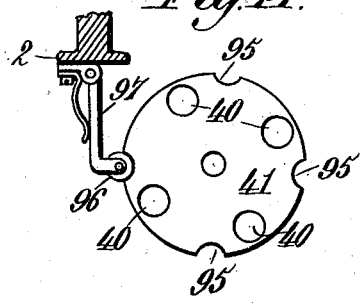
Witnesses.
Inventor,
Fred L. Seely,
By James L. Norris.
Atty.

UNITED STATES PATENT OFFICE.

FRED L. SEELY, OF ASHEVILLE, NORTH CAROLINA.

MACHINE FOR MAKING AND BOXING TABLETS.

SPECIFICATION forming part of Letters Patent No. 647,331, dated April 10, 1900.

Application filed July 27, 1899. Serial No. 725,316. (No model.)

*To all whom it may concern:*

Be it known that I, FRED L. SEELY, a citizen of the United States, residing at Asheville, in the county of Buncombe and State of North Carolina, have invented new and useful Improvements in Machines for Making and Boxing Tablets, of which the following is a specification.

This invention relates to machines for making and boxing tablets, pills, and similar articles; and it has for a general purpose to provide in a single machine suitable devices for feeding or supplying the powdered material from which the pills or tablets are to be formed, means for molding and compressing the tablets, mechanism for conveying the tablets from the mold and blowing away any superfluous dust, mechanism for moving boxes successively into position and ejecting the box proper from its casing into a position to be filled with tablets, and means for successively closing the filled boxes.

It is the principal object of my invention to provide a simple automatically-operated machine in which the operations of molding the tablets or pills, conveying them from the mold, removing superfluous dust, and filling a succession of boxes, will be performed consecutively and in due order, so that the filled boxes when discharged from the machine will be in readiness to be put on the market.

The invention consists in features of construction and novel combinations of devices and mechanisms in a machine for making tablets or the like and boxing the same, as hereinafter more particularly described.

Figure 1:
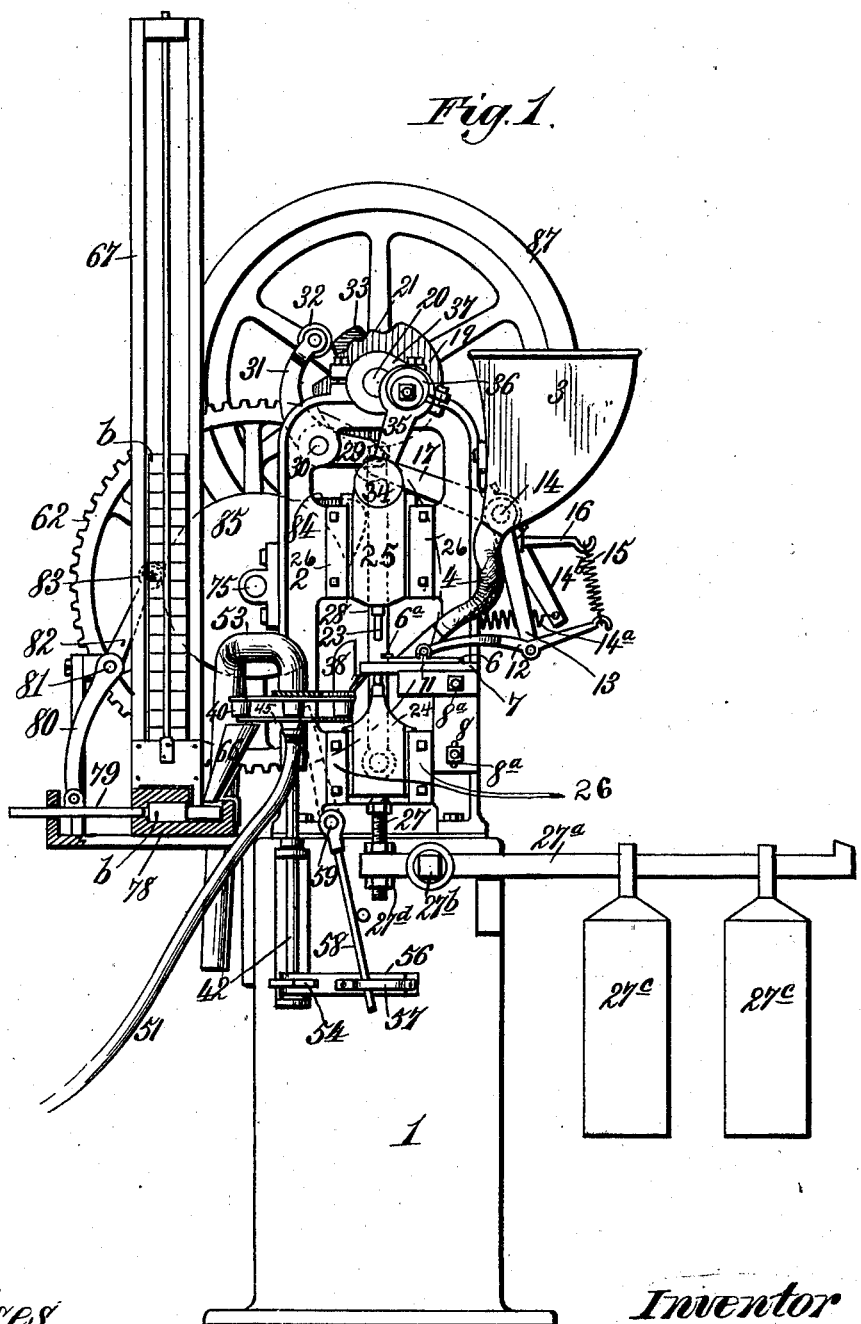
Figure 2:
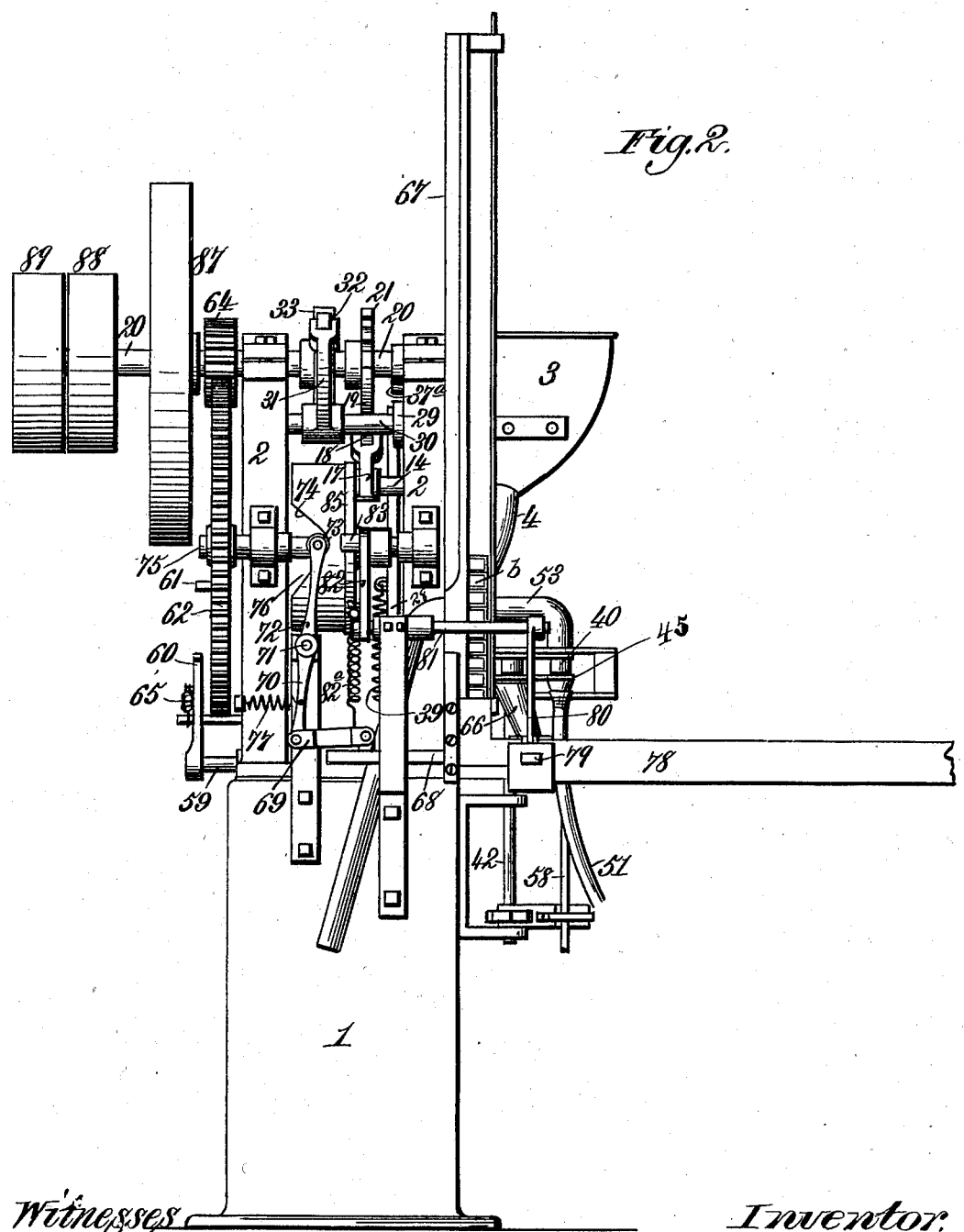
Figure 10:
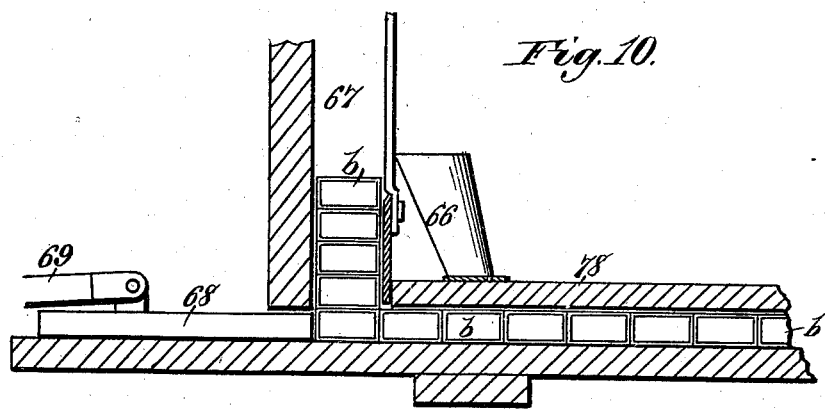
Figure 11:
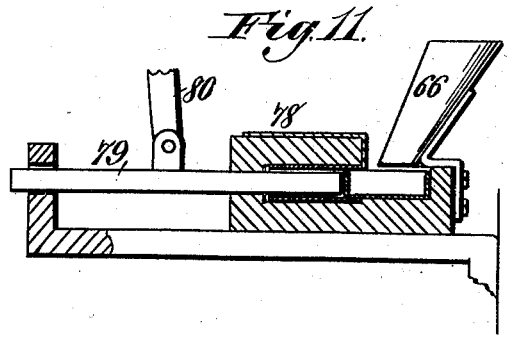
Figure 12:
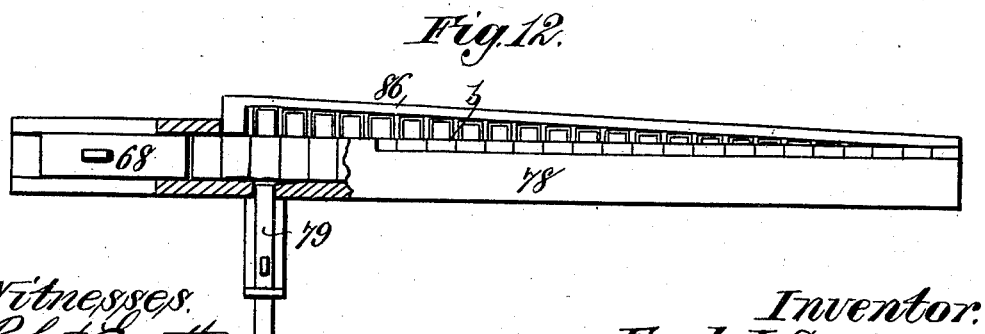

In the annexed drawings, illustrating the invention, Figure 1 is an elevation, partly in section, of my improved machine for making and boxing tablets. Fig. 2 is an elevation of the same at a right angle to the preceding view. Fig. 3 is a detail cross-sectional elevation of a part of the machine, showing a gang of three molds. Fig. 4 is a detail elevation, in longitudinal section, through one of the molds, showing plungers therein and also showing a section through the feed-slide and the rotary disk conveyer. Fig. 5 is a detail sectional elevation showing the lower plunger as having lifted a tablet to the top of the mold and also showing the feed-slide in the act of pushing the tablet toward a chute that discharges into one of the cylinders of the rotary disk conveyer. Fig. 6 is a plan of the rotary disk conveyer and the upper plate beneath which said conveyer is mounted. Fig. 7 is a cross-sectional elevation of the rotary disk conveyer and the upper and lower plates between which it is mounted. Fig. 8 is a plan of the partly-perforated plate that is below the rotary disk conveyer. Fig. 9 is a detail view of the ratchet mechanism for imparting the step-by-step rotary movement to the vertical shaft on which the rotary disk conveyer is mounted. Fig. 10 is a sectional elevation of the rack for containing a supply of boxes, showing also the slide for removing said boxes in succession from the bottom of the column of boxes placed in said rack. Fig. 11 is a sectional detail showing the manner of ejecting a box from its casing. Fig. 12 is a plan or part-horizontal section of a part of the machine, showing the manner of returning the boxes to their cases as the same are fed forward in succession to the discharge end of the machine. Figs. 13, 14, and 15 illustrate a modified form of mechanism for imparting the required step-by-step rotary movement to the vertical shaft on which the rotary disk conveyer is mounted.

Referring to Figs. 1 and 2, the numeral 1 designates the pedestal on which is mounted the machine-frame 2, which may be of any suitable construction. The reference-numeral 3 designates a hopper or magazine in which is placed the pulverized material or mixture that is to be formed into tablets or pills. This magazine or hopper may be supported in any suitable manner from the frame of the machine. The lower contracted end portion of the magazine or hopper 3 has attached thereto one end of a flexible feed-spout 4, the lower end of which connects with an inclined nipple 5 on a feed-slide 6, Figs. 1, 4, and 5. The feed-slide 6 is movable longitudinally on the top of a mold-block 7, that is suitably supported by a carriage 8, which is vertically adjustable on the frame of the machine. At a suitable point in the mold-block 7 there is a tubular die or mold opening 9 or a series or gang of such mold-openings, as preferred. The nipple 5 on the feed-slide 6 is tubular, and its tubular passage 10 is extended through said feed-slide to the under side thereof, so as to register with the mold opening or openings 9 when the feed-slide is in proper position. The sides of the feed-slide 6 may be provided with laterally-projecting lugs 11, Figs. 1 and 3, with which is engaged the forked end of a two-armed lever 12, that is pivoted intermediate its ends, as shown in Fig. 1, to the lower end of an arm 13 on a rock-shaft 14, Fig. 2. To the other end of the two-armed lever 12 there is attached one end of a tension-spring 15, the other end of which is supported by a rigid arm 16, projecting from the frame of the machine, as shown in Fig. 1. The purpose of this arrangement of two-armed lever 12 and spring 15 is to cause the feed-slide 6 to bear down on the top of the mold-block 7 to give a yielding pressure sufficiently strong to hold the feed-slide and mold-block in close operative relation and yet permit said feed-slide to yield slightly in an upward direction to prevent binding. On the rock-shaft 14 there is an upwardly and inwardly projecting arm 17, Figs. 1 and 2, carrying a roller 18 at its upper end. This roller 18 is acted on by a cam 19, that is mounted on the main shaft 20 of the machine. When the extended peripheral portion of the cam 19 is in contact with the roller 18, the rock-shaft arm 17 will be pressed downward, as shown in Fig 1, thereby causing the rock-shaft arm 13 to be thrown outward, so that the attached lever 12 will retract the feed-slide 6, as shown in Figs. 1 and 4. As the cam 19 continues its rotation a series of steps 21 on the reduced portion of said cam will come successively in contact with the roller 18, so as to permit the feed-slide 6 to be moved forward by the action of a spring 14$^a$ on an arm 14$^b$, attached to the rock-shaft 14, thereby imparting to said feed-slide a forward step-by-step movement, for a purpose hereinafter explained. It will be understood that the powdered material from the hopper 3 passes into the mold opening or openings 9 as the passage-way 10 through the feed-slide comes into register with said mold opening or openings. The tablets are formed in the mold opening or openings 9 by means of two coacting plungers 22 and 23, that are carried by heads 24 and 25, respectively. These heads 24 and 25 have a vertically-reciprocating motion toward and from each other in vertical guideways 26 on the machine-frame. The lower reciprocating head 24 normally rests on a set-screw 27, Figs. 1 and 3, which is supported by a lever 27$^a$, Fig. 1, fulcrumed to the pedestal 1 at 27$^b$ and having on its long end weights 27$^c$ sufficient to resist the pressure of the upper head 25 and its plunger 23 when normal, but to yield if by accident a double charge or any hard substance should fall into the mold. The set-screw 27 is adjustable by means of two nuts 27$^d$ to permit taking up wear, so that contact is at all times assured between the lower head 24 and said set-screw. The lower reciprocating plunger-head 24 has connected therewith the lower end of a link 28, Figs. 1, 2 and 3, the upper end of which is pivotally connected with an arm 29 on a rock-shaft 30, Figs. 1 and 2. This rock-shaft 30 also carries an arm 31, having a roller 32 mounted in its outer end in position to be acted on at suitable intervals by the enlarged portion of a cam 33 on the main shaft 20, as shown in Figs. 1 and 2. By the action of this cam 33 on the roller 32 the arm 31 is forced outward to rock the shaft 30, and thereby lift the arm 29, link 28, and lower plunger-head 24, so as to carry the lower plunger 22 upward through the mold-opening 9 to and above the upper end thereof, as shown in Fig. 5. The plunger-head 25 of the upper plunger 23 connects by a knuckle-joint 34 with the lower end of a pitman 35, Fig. 1, having on its upper end an eccentric-strap surrounding an eccentric 36 on a crank-arm 37, projecting from the main shaft 20, as shown in Fig. 1. Through this connection of the upper reciprocating head 25 with the shaft 20 the upper plunger 23 receives its proper time movements with relation to the working of the lower plunger 22, so that after the feed-slide 6 has caused the deposit of pulverized material in the mold-opening upon the upper end of the lower plunger 22 and after the said feed-slide has retired the two plungers will coact to compress the material in the mold, and thereby form a tablet. After this as the upper plunger is retracted the lower plunger will rise in and through the mold 9 to above the upper end thereof, and thereby lift the formed tablet above the top of the mold-block 7 in front of a lip 6$^a$ on the forward end of the feed-slide 6, so that when the latter again advances the completed tablet (designated by the letter $a$ in Fig. 5) will be pushed by said lip 6$^a$ off from said lower plunger 22 and drop therefrom through a funnel-shaped chute 38, Figs. 1, 4, and 5, and be received thence by rotary conveyer mechanism, to be presently described. After completing its upward stroke through the mold 9 the lower plunger 22 and its head 24 will be retracted by a spring 39, connected with the link 28, as shown in Figs. 2 and 3. I may sometimes provide a cam or toe 37$^a$, Fig. 2, on the crank-arm 37 to engage the top of the link 28 or the connected rock-shaft arm 29, so as to insure positive fall of the lower head 24, since some chemicals or substances of a gummy nature may cause the lower plunger 22 to stick in the mold and so prevent it from being pulled down by the spring 39, in which event, however, the toe 37$^a$ will impart a positive downward movement to the link 28 and attached lower plunger-head.

Measurement of the quantity of material required for each tablet is secured by raising or lowering (as may be required) the carriage 8, on which is supported the mold-block 7, the said carriage 8 being vertically adjustable on the frame of the machine by means of bolts with nuts 8$^a$, Fig. 1, thereon.

Thus it will be seen that since the lower plunger-head 24 travels the same distance vertically at all times the position of the mold-block 7 determines the working depth of the mold 9 therein when the head 24 and attached lower plunger 22 are at rest.

In Fig. 3 I have shown the mold-block 7 as provided with a gang or series of three molds 9, coacting with a corresponding number of upper and lower plungers or tablet-formers; but it will be understood that the mold-block may have only one mold-opening, or it may have any number of such openings, as desired. It will be understood, of course, that by employing a number of mold-openings and corresponding plungers the tablets can be formed with increased rapidity; but I do not wish to limit myself to employing a number of such openings, as the machine is operative with only one mold and its corresponding upper and lower plungers.

When the finished tablets are pushed off from the lower plungers 22 by the lips 6ª of the slide 6 into the funnel-shaped chute 38, they fall through the same into one of a number of open-ended tubular cells 40, that depend from the under side of a rotary disk 41, which is mounted on the upper end of a vertical shaft 42, Figs. 1, 2, 4, and 7. As shown, there are preferably four of these tubular cells 40, depending from the rotary disk 41 and forming therewith a rotary conveyer. Above a peripheral portion of the disk 41 there is mounted a segmental plate 43, Fig. 6, having a circular opening 44, that coincides with the lower end of the funnel-shaped chute 38, through which the tablets are received. A lower stationary plate 45 is mounted below the rotary disk conveyer, as shown in Figs. 1, 2, 4, and 7. As shown in Fig. 8, the lower stationary plate 45 has a segmental-shaped opening 46 cut into one portion of its periphery. It is also provided with a group of perforations 47, located immediately beneath the circular opening 44 in the upper stationary plate 43, so that as the tablets fall from the chute 38 into one of the tubular cells 40 any accompanying dust will sift through the perforations 47 and leave the plate 45 clean. There is also in the lower stationary plate 45 another group of perforations 48, Fig. 8, immediately beneath a similar group of perforations 49, Fig. 6, in the upper stationary plate 43. As shown in Fig. 7, the under side of the lower stationary plate 45 is provided with a nipple 50, surrounding the group of perforations 48, and to this nipple 50 there is connected a pipe 51, preferably a piece of flexible tubing or hose, for conveying a blast of air to blow away any adhering dust on the tablets in the tubular cell 40, between the group of perforations 48 and the group of perforations 49, when the rotary conveyer has been moved far enough to carry the cell 40 and its contents to that point. Surrounding the group of perforations 49 in the upper plate 43 there is a nipple 52 for connection of a pipe 53, Figs. 1 and 2, through which dust is conveyed away from the machine. The stationary plates 43 and 45, above and below the rotary disk conveyer, may be supported from the frame of the machine in any suitable or convenient manner. At suitable timed intervals the rotary disk conveyer 41 has imparted to it a quarter-revolution, which thereby moves a tubular cell 40 from beneath the chute 38 to the space between the perforations 48 and 49 of the respective plates 45 and 43, between which the disk conveyer operates. This movement of the rotary disk conveyer may be effected through the operation of suitable pawl-and-ratchet mechanism. As shown, for instance, in Fig. 9, there may be provided a ratchet-wheel 54, rigid on the shaft 42 of the rotary disk conveyer. The said shaft 42 is actuated through this ratchet-wheel by means of a spring-pawl 55, mounted in a laterally-projecting arm 56, one end of which is loosely engaged with said shaft. One side of this arm 56 is provided with a loop or strap 57, in which is engaged one end of an arm or lever 58, Figs. 1 and 2, on one end of a rock-shaft 59, the other end of which supports a vertically-projecting arm 60, Fig. 2, that is acted on at intervals by a pin 61, projecting from one side of a gear-wheel 62, driven from a pinion 64 on the driving-shaft 20. By engagement of the pin 61 with the lever 60 the shaft 59 is rocked in such direction as to cause the arm 58 to move the arm 56 backward in such manner that the spring-pawl 55 will slip over the teeth of the ratchet-wheel 54 without actuating the same, but bringing the pawl into position for operation as soon as the continued revolution of the gear 62 releases the arm 60 from the pressure of the pin 61, whereupon the arm 60 is restored to its former position by means of a spring 65, Fig. 2, which also at the same time causes the arm 58 to actuate the arm 56 in such direction that the pawl 55 will now drive the rotary shaft 42 through the engagement of said pawl with the ratchet-wheel 54 on said shaft, thus imparting a quarter-revolution to the rotary disk conveyer 41, hereinbefore described. By means of the described mechanism the rotary disk conveyer is operated step by step in such manner that a tubular cell 40, depending therefrom and filled with completed tablets, will be moved with the rotation of said disk from beneath the chute 38 to the space between the perforations 48 and 49 of the plates 43 and 45 and subsequently to the open space 46 in the lower plate. It is preferable to provide the rotary disk 41 with, say, four tubular cells 40, so that when one of said cells is beneath the chute 38 in position to be filled with completed tablets another tubular cell will be in position to have the dust blown from the tablets by a blast of air directed through the pipe 51 into the pipe 53 and thence out of the machine, and another tubular cell 40 will be over the open space 46, discharging its contents, while still another cell, for the time being idle, will be in readiness to move under the charging-chute 38 at the proper time.

The completed tablets that are discharged from a tubular cell 40 at the segmental space or opening 46 of the lower plate 45 will fall into a funnel-shaped chute 66, Figs. 1, 2, and 4, by which they are directed into a box that is in position to be filled.

The boxes $b$ that are to be filled with the finished tablets, pills, or like articles molded in the machine will be stacked in a vertical column within a suitable rack 67, Figs. 1, 2, and 10. The boxes $b$ may be made of pasteboard or similar material and are of that kind in which the box proper is inclosed in an open-ended casing, from which the box is pushed endwise in order to get at its contents or for opening the box. As placed in the rack 67 the boxes are in a closed condition. These boxes are fed from the rack consecutively at the bottom thereof, the column or stack of boxes descending gradually in the rack as the several boxes are moved out in succession from the bottom of the stack. In order to thus remove these boxes or feed them from the rack, there is provided a horizontally-movable slide 68, Figs. 2 and 10. This slide 68 connects by a link 69 with the lower end of an arm 70 on a pivot or rock-shaft 71, from which also projects an arm 72, having on its extremity a roller 73, that is acted on by the face of a cam 74, mounted on the same shaft 75 by which the gear-wheel 62 is carried. In the face of the cam 74 there is a notch or recess 76, that receives the roller 73 when the slide 68 is retracted by a spring 77, that connects with the arm 70, through which said slide is actuated. By the rotation of the cam 74 the roller 73 is directed out of the notch or recess 76 into contact with the face of said cam 74, thereby oscillating the arms 72 and 70 in such manner as to move forward the slide 68 against the lowermost box in the column or stack contained in the rack 67, thereby pushing said box out from beneath the stack and into a guideway 78, that projects horizontally from the lower end of the rack 67, as shown in Figs. 2 and 10. As each box is pushed out from beneath the stack the remaining boxes in said stack settle gradually, and each succeeding box as pushed out from the bottom of said stack comes in contact with and pushes along the preceding box. As each box comes in line with the funnel-shaped chute 66 the box proper is pushed out from its casing by means of an ejector-slide 79, Figs. 1, 2, 11, and 12. This ejector-slide 79 is actuated from an arm 80 on one end of a rock-shaft 81, that carries at its other end an arm 82, having a roller 83, acted on by a projection 84 from a peripheral cam 85 on the shaft 75, Figs. 1 and 2. By the action of the ejector-slide 79 the box is pushed out from its casing a sufficient distance to come beneath the chute 66 to receive the charge of tablets therefrom. A spring $82^a$, Fig. 2, is connected with the arm 82 for the purpose of restoring the ejector-slide. By the continued action of the slide 68, that feeds out the boxes from the bottom of the stack, the several boxes are consecutively moved forward and in contact with an inclined guide 86, Fig. 12. This inclined guide 86 is so disposed, as shown in Fig. 12, that as the opened boxes are successively moved forward the filled boxes will be gradually returned to their respective casings before the filled boxes are discharged from the machine. At the end of the guideway 78 there may be placed any suitable table or receptacle upon or in which the filled boxes can be deposited.

On the main shaft 20 there are a fly-wheel 87 and fast and loose pulleys 88 and 89, Figs. 1 and 2.

It will be observed that the several devices and mechanisms comprised in the machine are so arranged that the successive operations of feeding the pulverized material, forming the same into tablets, lifting the tablets from the molds, discharging the tablets into a conveyer, removing surplus powder or dust, and discharging the tablets into a box that has been brought into position to be filled, as well as the operations for feeding the empty boxes forwardly, opening said boxes, and closing the filled boxes in the course of their discharge from the machine, are all performed automatically and in successive time movements with accuracy and great rapidity. By employing several molds and their accompanying operative mechanism the tubular cells 40, and consequently the boxes or other ultimate receptacles, can be filled with great rapidity. The machine is easy of operation and requires very little attention.

Instead of actuating the shaft 42 of the rotary conveyer 40 41 by mechanism such as shown in Figs. 1, 2, and 9 I may employ the mechanism shown in Figs. 13, 14, and 15. In this case the vertical shaft 42 may be extended above the cell-carrying plate 41 and be provided with a bevel-gear 90, Fig. 13, meshing with a bevel-pinion 91 on a shaft 92, having thereon a spur-pinion 93, through which said shaft 92 is rotated at intervals. This periodical rotation of the shaft 92 is effected by means of a segmental rack 94, Figs. 13 and 15, that is adjustable on the cam 85 and which is long enough to turn the pinion 93 one revolution at suitable time intervals as said rack periodically comes into mesh with said pinion. The periphery of the cell-carrying plate 41 may be provided at suitable intervals with notches 95 to be successively engaged by a roller 96 on a spring-pressed hinged arm 97, as shown in Figs. 13 and 14, so as to serve as a brake to prevent the plate 41 turning too far and to insure a proper position of the several cells 40 at each partial revolution of the rotary conveyer.

What I claim as my invention is—

1. In a machine for making tablets, the combination of a tubular mold open at top and bottom, upper and lower plungers to operate in said mold, reciprocating heads to which said plungers are attached, a feed-slide having an opening to register with the molds, a magazine to contain the material to be formed into tablets, a flexible connection between said magazine and the opening in said feed-slide, lever mechanism for actuating said slide, a driving-shaft having a cam for actuating the lever mechanism of said slide, lever mechanism for actuating the reciprocating head that carries the lower plunger, a link connecting said head with said lever mechanism, a cam on the driving-shaft to act on said lever mechanism, a spring connected with said slide, a pitman connected with the reciprocating head of the upper plunger, and eccentric devices connecting said pitman with the driving-shaft, substantially as described.

2. In a machine for making tablets, the combination with mechanism for molding the tablets and a chute for receiving the tablets from said molding mechanism, of a rotary disk conveyer having a number of open-ended tubular cells depending therefrom, a fixed plate supported above said rotary disk conveyer and having at one point a circular opening to register with said chute and with one of said tubular cells and provided at another point with a group of perforations, a fixed plate supported beneath a portion of the rotary disk conveyer and having therein groups of perforations located in line with the positions of two adjoining tubular cells of the rotary disk conveyer, a portion of said lower plate being cut away, and mechanism for rotating the said disk conveyer step by step, substantially as described.

3. In a machine for making tablets, the combination with mechanism for molding tablets, and a chute for receiving the tablets from said molding mechanism, of a rotary disk conveyer provided with a number of depending open-ended tubular cells to successively receive quantities of the completed tablets, fixed plates supported above and below a portion of said rotary disk conveyer, the upper plate being provided with an opening to register with the chute in which the tablets are received and both of said plates being provided with perforations in line with the position of an open-ended tubular cell, and pipe connections to said perforations for passing a blast of air to remove dust or powder from the tablets contained in the tubular cell, substantially as described.

4. In a machine for making tablets, the combination with mechanism for molding tablets and a chute for receiving the tablets from the molding mechanism, of a rotary disk conveyer supported in a horizontal position and provided with a central vertical shaft, a number of tubular open-ended cells depending from said disk, driving mechanism for the shaft of said rotary disk conveyer, and means for actuating said driving mechanism to operate the rotary disk conveyer step by step, substantially as described.

5. In a machine for making tablets, the combination of a mold-block provided with a vertical open-ended mold-opening, a feed-slide having an opening to register with said mold-opening, a magazine to contain the material for making tablets, a flexible tubular connection from said magazine to the opening in said feed-slide, upper and lower plungers arranged to operate in the mold-opening to form a tablet therein, the lower plunger being adapted to lift a completed tablet to the top of the mold and the feed-slide being adapted and arranged to push off said completed tablet, a chute to receive the completed tablets, and a rotary disk conveyer having tubular cells depending therefrom to convey away the tablets, substantially as described.

6. In a machine for making and boxing tablets, the combination of molding mechanism for making the tablets, box-filling mechanism, conveyer mechanism to receive the tablets from said molding mechanism and deliver them to the box-filling mechanism, driving means and connections between said driving means and the molding mechanism, conveyer mechanism and box-filling mechanism to actuate said mechanisms in time movements, substantially as described.

7. In a machine for making and boxing tablets, the combination of molding mechanism for making the tablets, box-filling mechanism, an intermittently-movable conveyer to receive the tablets from said molding mechanism and deliver them to the box-filling mechanism, means for successively closing the filled boxes, driving means, and connections between said driving means and the molding mechanism, conveyer and box-filling mechanism to actuate the same in time movements, substantially as described.

8. In a machine for making and boxing tablets, the combination of molding mechanism for making the tablets, intermittently-movable conveyer mechanism for receiving the tablets from the molding mechanism, an air-blast to remove dust and powdered material from said tablets, a rack to contain a vertical column or stack of closed boxes, ejector mechanism for feeding boxes successively from the bottom of said rack, ejector mechanism to successively push out each box from its casing into position to be filled with tablets, means for successively closing filled boxes, driving means, connections between said molding mechanism, conveyer mechanism and ejector mechanisms for actuating the same in time movements, substantially as described.

In testimony whereof I have hereunto set my hand in presence of two subscribing witnesses.

FRED L. SEELY.

Witnesses:
C. RANKIN,
F. M. LEE.